US011021038B2

(12) United States Patent
Hensler et al.

(10) Patent No.: US 11,021,038 B2
(45) Date of Patent: Jun. 1, 2021

(54) LIGHTWEIGHT VEHICLE HVAC STRUCTURE

(71) Applicant: Calsonic Kansei North America, Inc., Farmington Hills, MI (US)

(72) Inventors: Aaron Kirk Hensler, South Lyon, MI (US); Scott Torok, Commerce Township, MI (US)

(73) Assignee: MARELLI CABIN COMFORT USA, INC., Shelbyville, TN (US)

( * ) Notice: Subject to any disclaimer, the term of this patent is extended or adjusted under 35 U.S.C. 154(b) by 227 days.

(21) Appl. No.: 16/214,391

(22) Filed: Dec. 10, 2018

(65) Prior Publication Data

US 2019/0176569 A1 Jun. 13, 2019

Related U.S. Application Data

(60) Provisional application No. 62/597,338, filed on Dec. 11, 2017.

(51) Int. Cl.
*B60H 1/00* (2006.01)
*B60H 1/32* (2006.01)

(52) U.S. Cl.
CPC ..... *B60H 1/00471* (2013.01); *B60H 1/00514* (2013.01); *B60H 1/00521* (2013.01); *B60H 1/00528* (2013.01); *B60H 1/00564* (2013.01); *B60H 1/32* (2013.01); *B60H 2001/006* (2013.01)

(58) Field of Classification Search
CPC .. B60H 1/00471; B60H 1/00521; B60H 1/32; B60H 1/00514; B60H 1/00564; B60H 1/00528; B60H 2001/006
See application file for complete search history.

(56) References Cited

U.S. PATENT DOCUMENTS

| | | | | |
|---|---|---|---|---|
| 3,324,678 A | * | 6/1967 | Jones | F25D 17/065 62/276 |
| 3,475,920 A | * | 11/1969 | Jacobs | F25D 23/068 62/273 |
| 4,607,564 A | | 8/1986 | Stahle et al. | |
| 5,199,846 A | * | 4/1993 | Fukasaku | B60H 1/00471 415/119 |
| 2002/0170707 A1 | * | 11/2002 | Shibata | B60H 1/00521 165/202 |
| 2003/0145978 A1 | | 8/2003 | Tsurushima et al. | |
| 2007/0039713 A1 | * | 2/2007 | Suzuki | B60H 1/00514 165/42 |
| 2009/0165486 A1 | * | 7/2009 | Harlen | F25D 21/08 62/276 |
| 2010/0240294 A1 | | 9/2010 | Goupil | |

(Continued)

FOREIGN PATENT DOCUMENTS

WO WO2016/166987 10/2016

OTHER PUBLICATIONS

International Search Report re Application No. PCT/US2018/064747 dated Feb. 26, 2019.

*Primary Examiner* — Emmanuel E Duke
(74) *Attorney, Agent, or Firm* — Foley & Lardner LLP

(57) ABSTRACT

An HVAC system includes a blower housing including a blower inlet and a blower outlet, the blower housing having a plastic skeleton structure. The HVAC system further includes a foam blower liner disposed within and coupled to the blower housing.

17 Claims, 14 Drawing Sheets

(56) References Cited

U.S. PATENT DOCUMENTS

2010/0248605 A1* 9/2010 Sharma .................. B60H 1/28
                                                  454/140
2012/0114512 A1   5/2012 Lofy et al.
2015/0192131 A1*  7/2015 Jones ................. F04D 29/4213
                                                  415/205
2016/0369819 A1  12/2016 Lofy et al.

* cited by examiner

| PART | ORIGINAL MASS | ESTIMATED MASS | REDUCTION |
|---|---|---|---|
| BLOWER FIRST BODY 22 | 262g | 230g | 32g (7%) |
| BLOWER SECOND BODY 24 | 186g | 174g | 12g (13%) |
| EVAPORATOR FIRST BODY 64 | 389g | 208g | 181g (46%) |
| EVAPORATOR SECOND BODY 66 | 240g | 188g | 52g (22%) |

FIG. 14

LIGHTWEIGHT VEHICLE HVAC STRUCTURE

CROSS-REFERENCE TO RELATED APPLICATION

This application claims the benefit of and priority to U.S. Provisional Patent Application No. 62/597,338, filed Dec. 11, 2017, which is incorporated herein by reference in its entirety.

BACKGROUND

The present application relates generally to lightweight vehicle heating, ventilating, and air conditioning ("HVAC") systems, and more specifically to HVAC systems having a plastic skeleton and a foam liner disposed therein.

Various conventional vehicle HVAC (i.e., climate control) systems heat, cool, clean, regulate, ventilate, and dehumidify air entering the passenger compartment (i.e., vehicle cabin), based on inputs from an operator and/or electronic sensors. These HVAC systems may include components, such as an air filter, a blower and/or blower motor, a heater core, an evaporator core and drain, mode and blend doors, and/or various electrical elements such as actuators, temperature sensors, etc. In conventional HVAC systems, these components are surrounded by and enclosed within a solid housing.

Recently, vehicle fuel or battery efficiency standards are becoming more stringent. One way of improving vehicle efficiency is reducing the weight of the vehicle itself, including individual systems (e.g., HVAC systems) in the vehicle. Generally, HVAC systems are optimized for airflow when operating in various (e.g., fresh or recirculating) modes in order to reduce the energy consumption of the HVAC system while providing the desired heating and cooling properties. This optimization limits the flexibility of designers to reduce the overall size and surface area of the HVAC system without affecting the performance of the HVAC system. Some HVAC systems may be formed from plastics (e.g., polypropylene) to reduce the weight of the HVAC system. While these materials have good strength properties, they provide poor noise and thermal insulation, which result in performance limitations.

It would therefore be advantageous to provide an improved HVAC system that addresses these and other issues.

SUMMARY

An HVAC system includes a blower housing including a blower inlet and a blower outlet, the blower housing having a plastic skeleton structure. The HVAC system further includes a foam blower liner disposed within and coupled to the blower housing.

An HVAC system includes an evaporator housing having an evaporator inlet and an evaporator outlet, the evaporator housing having a plastic skeleton structure. The HVAC system further includes a foam evaporator liner disposed within and engaging the an entire inner surface of the evaporator housing. The HVAC system further includes an evaporator disposed within the foam evaporator liner.

These and other advantageous features will become apparent to those reviewing the disclosure and drawings.

BRIEF DESCRIPTION OF THE DRAWINGS

FIG. 14 is a table showing mass reduction between an all-plastic polypropylene HVAC system and a hybrid system with a plastic skeleton and a foam liner.

DETAILED DESCRIPTION

Referring to the FIGURES generally, an HVAC system for a vehicle includes a mesh housing structure and a foam insert provided within the housing structure. According to one exemplary embodiment as will be described herein, the HVAC system may include a blower assembly and an evaporator assembly coupled to and downstream from the blower assembly. The blower assembly and the evaporator assembly cooperate to accelerate air received in the system and selectively cool the air in the evaporator assembly for introduction to a passenger compartment in the vehicle. It should be understood that while the FIGURES show the HVAC system having a blower assembly and an evaporator assembly, according to other exemplary embodiments, the HVAC system may include more or fewer components, including a heater.

Figure 1:
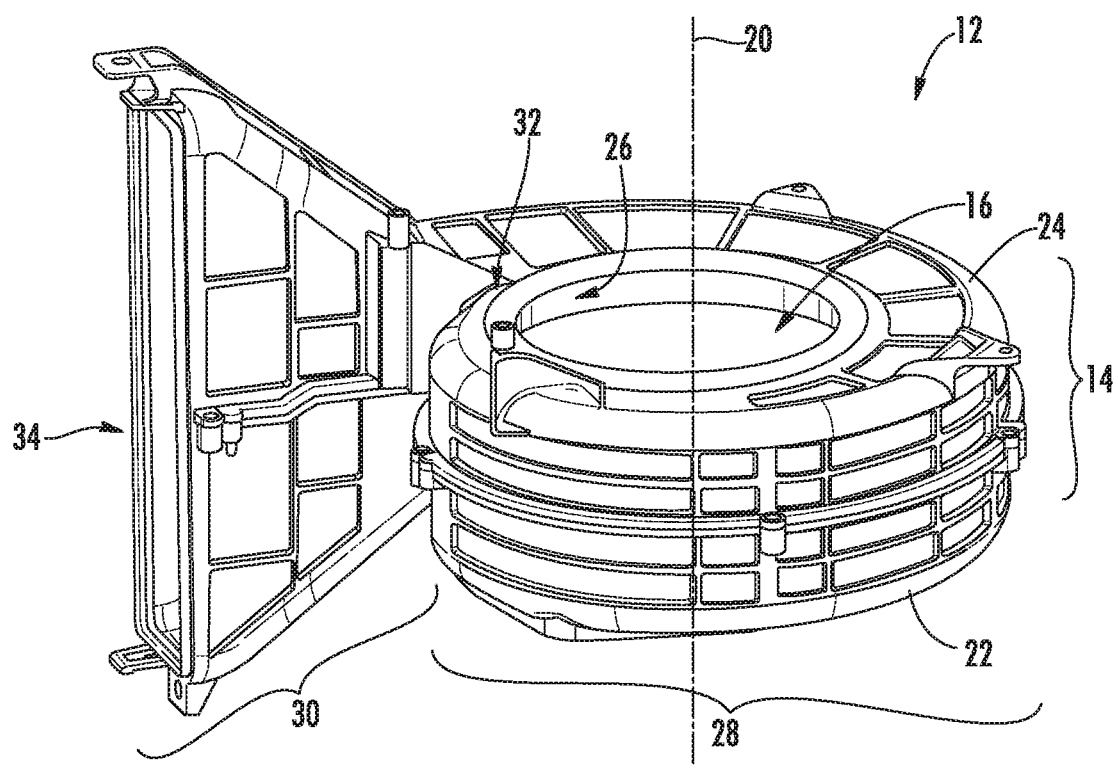
FIG. 1 is a perspective view of a blower assembly according to an exemplary embodiment.
Figure 2:
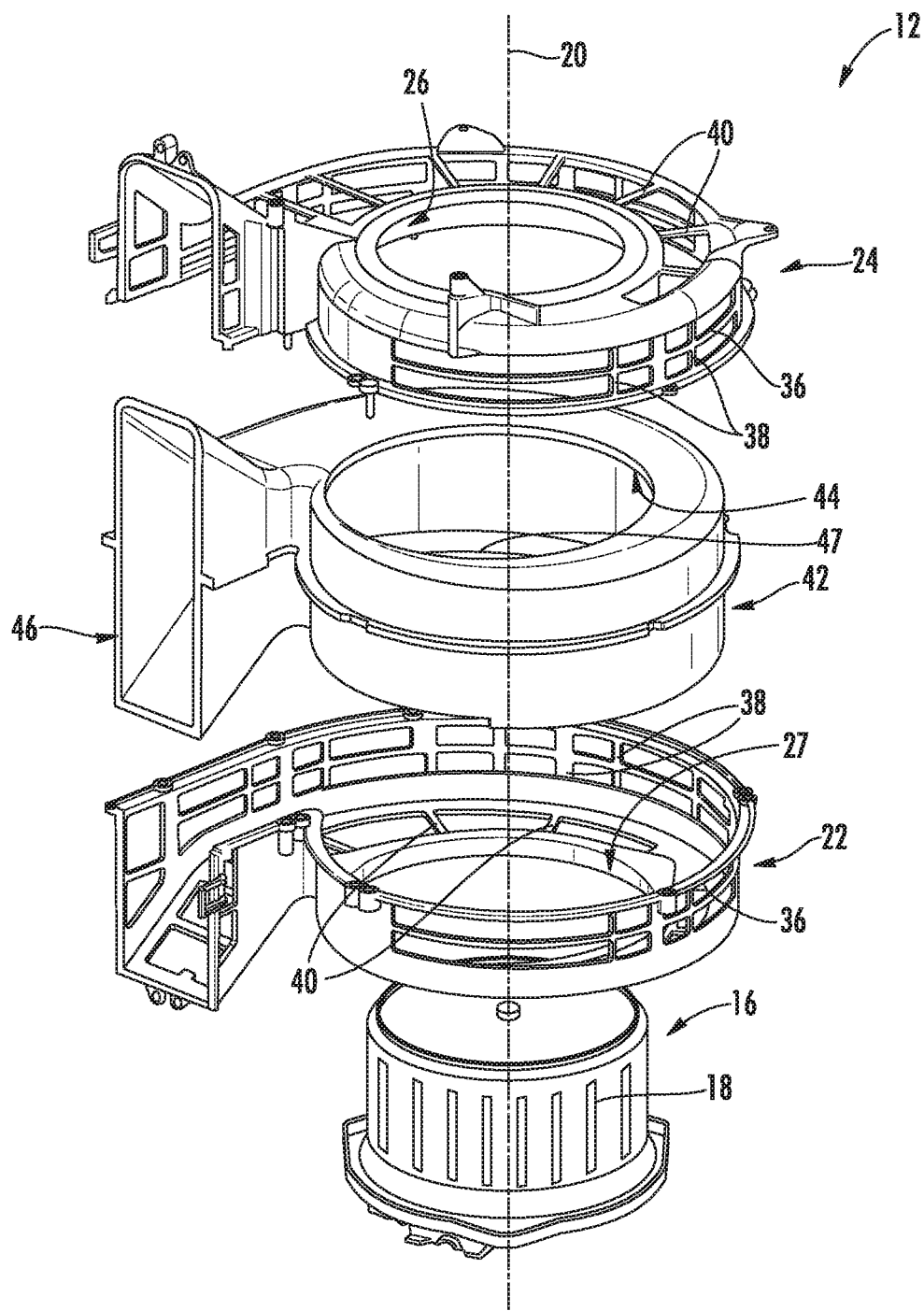
FIG. 2 is an exploded view of the blower assembly of FIG. 1.

Referring now to FIG. 1, a blower assembly 12 is shown according to an exemplary embodiment. The blower assembly 12 includes a scrolled blower housing 14 (e.g., housing assembly, case, shell, body, etc.) and a blower 16 disposed within the blower housing 14. Referring to FIGS. 1 and 2, the blower 16 includes an electric motor coupled to a fan cage 18 having a plurality of blades arranged in a cylindrical orientation and configured to rotate about a blower axis 20. The blower housing 14 is formed from at least two components, including a first (i.e., lower, rear, etc.) body 22 and an opposing second (i.e., upper, forward, etc.) body 24 disposed on and engaging the first body 22. According to an exemplary embodiment, corresponding edges of the first body 22 and the second body 24 may define substantially the same outer profile, such that the edges are configured to align and/or mate with each other.

A blower inlet 26 is defined in the second body 24 at an upstream end of the blower assembly 12 and is configured to correspond to (e.g., be substantially aligned with) the fan cage 18, such that the blower inlet 26 defines a substantially circular profile annularly formed about the blower axis 20. Referring now to FIG. 2, the first body 22 includes a fan opening 27. The fan opening 27 is configured to receive the blower 16 therethrough for insertion into the blower housing 14 in the direction of (i.e., along) the blower axis 20, from the first body 22 toward the second body 24.

Referring again to FIG. 1, the blower housing 14 includes a scroll portion 28, in which air follows a spiral flow pattern around the blower 16, and a manifold portion 30, which extends downstream from the scroll portion 28 at a scroll cut-off 32 (e.g., tongue, corner, etc.). While FIGS. 1 and 2 show the manifold portion 30 integrally formed as part of the first and second bodies 22, 24 making up the blower housing 14, according to other exemplary embodiments, the manifold portion 30 may be separately formed and coupled to the scroll portion 28.

A blower outlet 34 is defined at a downstream end of the blower assembly 12, more specifically at a downstream end of the manifold portion 30, and is defined by corresponding portions of the first and second bodies 22, 24. During operation of the blower assembly 12, the fan cage 18 rotates, drawing air in through the blower inlet 26, annularly through the blower housing 14, and out through the blower outlet 34.

As discussed above, a conventional HVAC system may be formed from a solid housing structure formed from a polymer such as a polypropylene (20% talc-filled or PPT20) material, which reduces the weight of the system, compared to a metal or other more dense material. However, when turbulent air directly contacts the polypropylene, the material transfers most of the noise generated by the rotation of the blower to other portions of the vehicle, resulting in relatively loud operation of the HVAC system. Additionally, the polypropylene has relatively poor heat insulation properties, reducing the heating or cooling efficiency of the system.

Further, even though polypropylene reduces the weight of the system, the housing in the conventional system must still form a solid structure in order to avoid air from leaking out of the system, which would otherwise generate operational efficiency losses. The solid surfaces provide more structural rigidity than is required to support the weight of a blower in order to provide the fully enclosed housing.

Referring to FIG. 2, the first and second bodies 22, 24 each define a skeleton (e.g., mesh, lattice, grid, etc.) structure configuration, which forms an outer profile of the blower assembly 12. The skeleton structures include plastic or other material forming solid portions or features (e.g., walls) at each of the edges and transition regions, such as those forming acute angles (e.g., the scroll cut-off 32) of the first and second bodies 22, 24. Voids (i.e., windows) are formed between various edges and transition regions, reducing the overall plastic material in the blower housing 14 and therefore significantly reducing the weight. As will be discussed in further detail below, a foam liner is disposed in each skeleton component, providing a sealed flexible passage, which relies on the strength of the skeleton to prevent the liner from flexing, affecting the airflow therethrough. As a result of this hybrid design, the weight of the various components in the HVAC system may be reduced by approximately 20% to 25% because the described combination of plastic and foam has a lower volumetric material density compared to conventional all-plastic designs. The foam also critically removes unnecessary foam insulation material on mating components, thereby serving to reduce weight and simplify designs of components attaching to the blower assembly 12.

The skeleton structure includes a plurality of ribs extending across the blower housing 14, separating the voids to provide additional structural rigidity to the blower housing 14 to make up for the removal or absence of material in the blower housing 14. For example, the plurality of ribs include annular ribs 36 extending annularly about the blower axis 20 (e.g., circumferentially around each of the first and second bodies 22, 24), axial ribs 38 extending substantially parallel to the blower axis 20, and radial ribs 40 extending substantially radially outward from the blower axis 20. The annular ribs 36 limit deformation of the blower housing 14 due to torsion applied on the blower housing 14 about the blower axis 20 (e.g., due to the rotational motion of the blower 16), the axial ribs 38 limit deformation in the axial direction (e.g., due to the weight of the second body 24 or other structure on the first body 22, and the radial ribs 40 limit deformation of the blower housing 14 in the radial direction.

The first body 22 and the second body 24 may be formed from one or more lightweight plastic composites, such as polypropylene polymers that may optionally include fillers (e.g., cellulose, talc, mica, clay, calcium carbonate, glass fiber, etc.), and may be formed using conventional molding techniques (e.g., injection, blow, compression, film insert, thermoforming, rotational, etc.). According to an exemplary embodiment, the first and/or the second bodies 22, 24 may be formed by injection molding a polypropylene (20% talc-filled) (PPT20) plastic material. According to yet another exemplary embodiment, the first and/or second bodies 22, 24 may be stamped components formed from metal or other suitable materials.

The first body 22 may have a material thickness between approximately 2.0 mm and 4.0 mm. The second body 24 may be have a material thickness between approximately 1.0 mm and 3.0 mm. Notably, the first body 22 may have a greater material thickness than the second body 24, such that the additional material provides enough structural rigidity to support the weight of the second body 24. Meanwhile, the second body 24 maintains a smaller material thickness, because without the requirement to support the weight of other portions of the blower housing 14, less material is required in the second body 24. While FIG. 2 shows the second body 24 disposed on top of the first body 22, it should be understood that the arrangements can be reoriented, such that the second body 24 is disposed under the first body 22 and has a greater material thickness than the first body 22 to ensure that the ticker portion of the blower housing 14 is supporting the weight of the first body 22. In either configuration, the lower structure may have a greater material thickness to support the blower 16 and various vehicle mounting constraints.

Referring still to FIG. 2, the blower assembly 12 further includes a foam blower liner 42 (i.e., a liner) disposed within and defining a complementary shape to the blower housing 14. For example, the blower liner 42 includes a blower liner inlet 44 complementary to and substantially the same shape as the blower inlet 26. Similarly, the blower liner 42 defines a spiral shape and a blower liner outlet 46 complementary to and substantially the same shape as the blower outlet 34. When the blower liner 42 is disposed within the blower housing 14, the blower liner inlet 44 is aligned with the blower inlet 26, and the blower liner outlet 46 is aligned with the blower outlet 34, allowing air to freely pass into and out of the blower assembly 12. The blower liner 42 further includes a liner fan opening 47 complementary to and substantially the same shape as the fan opening 27. When the blower liner 42 is disposed within the blower housing 14, the liner fan opening 47 is aligned with the fan opening 27, such at least a portion of the blower 16 (e.g., the fan cage 18) may be received in the blower housing 14 through the fan opening 27 and then the liner fan opening 47. According to an exemplary embodiment, one or more of the blower liner inlet 44, the blower liner outlet 46, and/or the liner fan opening 47 may be laser cut after the blower liner 42 is formed.

Figure 3:
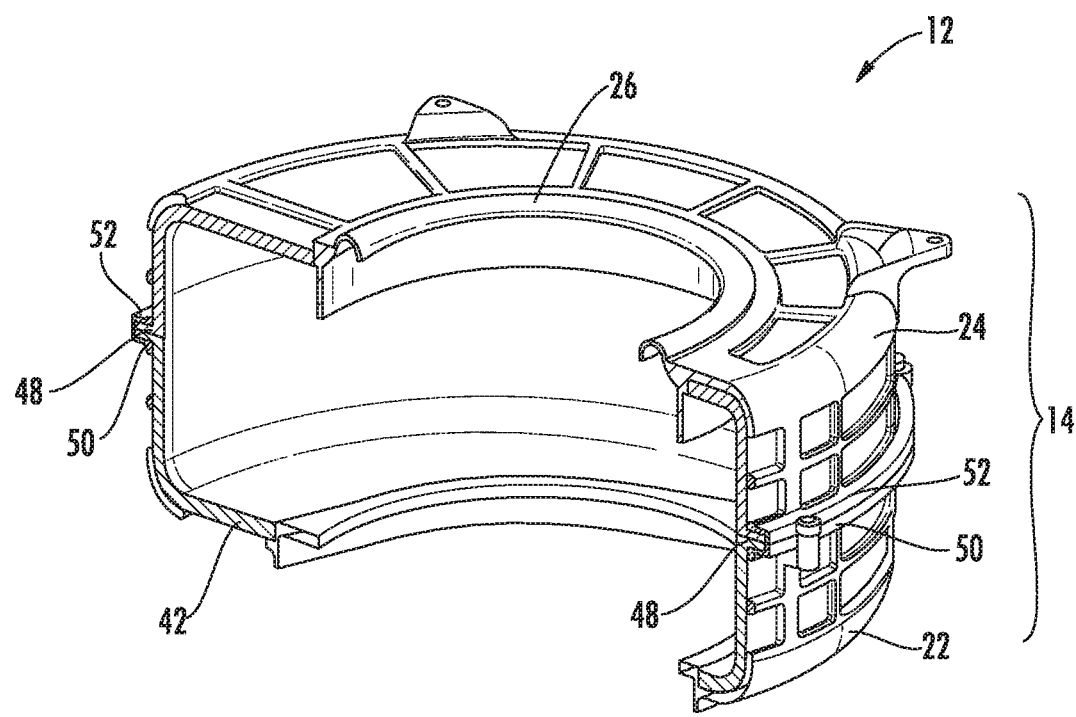
FIG. 3 is a perspective cross-sectional view of the blower assembly of FIG. 1.
Figure 4:
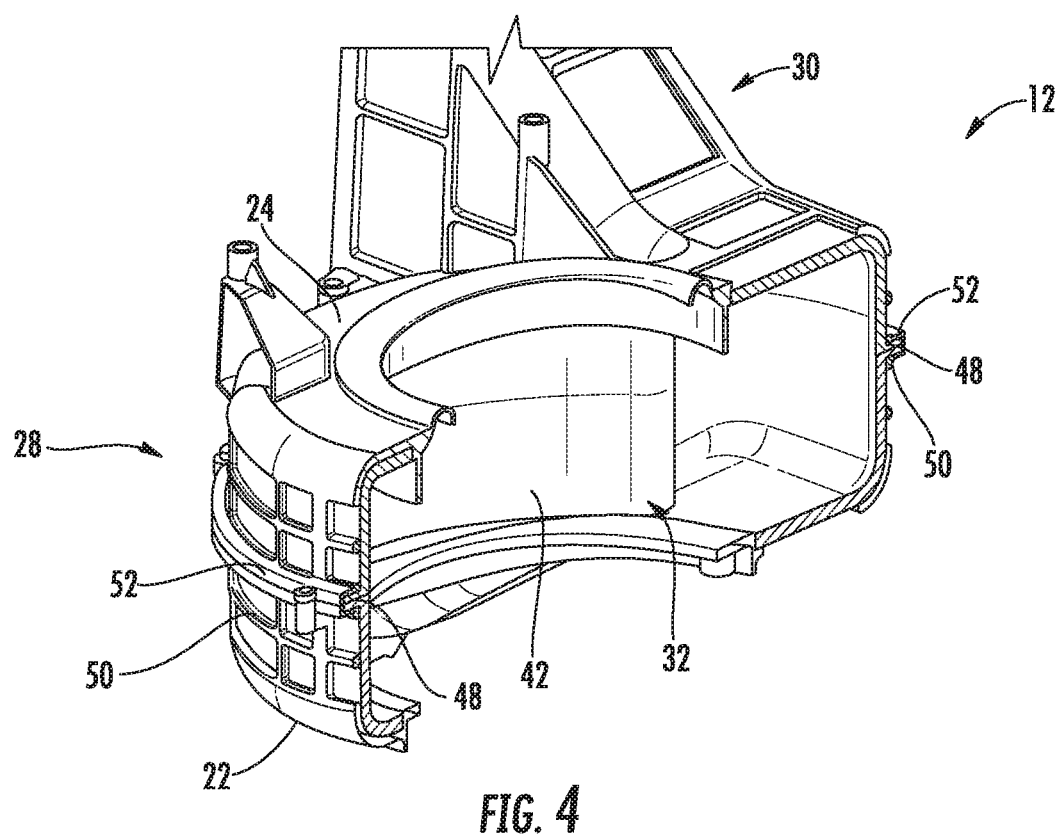
FIG. 4 is another perspective cross-sectional view of the blower assembly of FIG. 1, showing the scroll cut-off and the manifold portion of the blower assembly.

Referring now to FIGS. 3 and 4, the blower liner 42 is provided within and directly engages and/or is coupled to an inner surface of the blower housing 14. In this configuration, the blower housing 14 provides a rigid outer structure, but is isolated from the air in the blower assembly 12. In other words, the blower liner 42 seals the interior of the blower assembly 12 and air passing therethrough only contacts the blower liner 42. To maintain the shape of the blower liner 42 after it is installed, portions of the blower liner 42 may be coupled to the blower housing 14. For example, portions of the uppermost surface (e.g., proximate the second body 24 of the blower housing 14) of the blower liner 42 may be coupled to the blower housing 14 to ensure that the uppermost surface does not sag over time due to the downward force of gravity. According to an exemplary embodiment, the blower liner 42 may be ultrasonically welded to the blower housing 14 proximate the blower inlet 26. The ultrasonic welding may include three or more welds, including at least one weld proximate the scroll cut-off 32, shown in FIG. 4. According to other exemplary embodiments, the blower liner 42 may be coupled to the blower housing 14 in other ways (e.g., adhesive, fasteners, form fitting, interference fit, etc.).

According to an exemplary embodiment, the blower liner 42 is a three-dimensional closed-cell foam formed from a combination of cross-linked polyethylene material (XLPE) and cross-linked polypropylene material (XLPP) using vacuum-formed fabrication techniques. For example, the blower liner 42 may be formed from two opposing bodies, which are each vacuum-formed and then thermally bonded to each other. During the vacuum forming process, a lip 48 (i.e., a tongue) may be formed by each half of the blower liner 42, which are then coupled. The first body 22 includes a first flange 50 at an upper edge thereof extending radially outward and the second body 24 includes a second flange 52 at a lower edge thereof extending radially outward, complementary to and aligned with the first flange 50. The second body 24 may be coupled to the first body 22 at the first and second flanges 50, 52. As shown in FIG. 3, the lip 48 of the blower liner 42 may be disposed and pressed (i.e., sandwiched, compressed, etc.) between the first and second flanges 50, 52, securing the blower liner 42 in place with a tongue-and-groove configuration. According to another exemplary embodiment, the lip 48 may be ultrasonically welded to the first and/or second flanges 50, 52 or other portions of the first and/or second bodies 22, 24.

According to other exemplary embodiments, the tongue-and-groove design configuration may be eliminated for further reduction in manufacturing cost and complexity. By having substantially the same or larger shape as the inner surface of the blower housing 14, the blower liner 42 may fit securely within the blower housing 14. It should be understood that the blower liner 42 may be formed with a shape complementary to the inner surface of the blower housing 14, such that the blower liner 42 defines the shape before it is inserted into the blower housing 14. According to yet another exemplary embodiment, the blower liner 42 may be disposed outside the blower housing 14. In this configuration, the blower housing 14 provides internal structural rigidity to the blower liner 42 and the blower liner 42 is wrapped around and seals the outside of the blower housing 14.

According to other exemplary embodiments, the blower liner 42 may also be fabricated using blow-molded cross link material, or an unformed, flat foam locally applied to reduce the noise condition created by air flow on the plastic case. Other foam materials may be used according to other exemplary embodiments. Material thicknesses of the blower liner 42 may be approximately 4 mm to 6 mm, which maintain the structural integrity and shape of the blower liner 42 during assembly and while the HVAC system is in operation.

Figure 5:
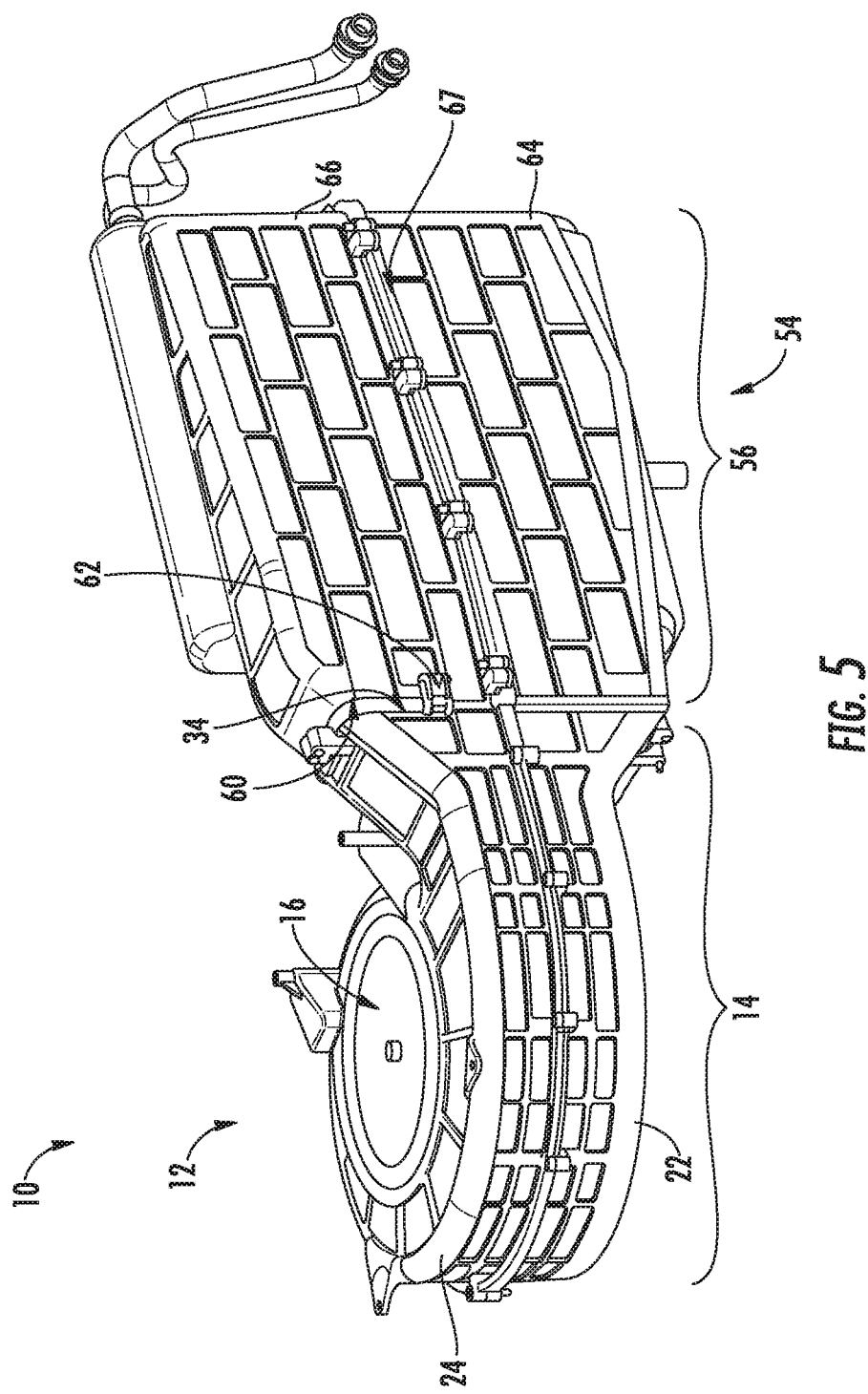
FIG. 5 is a perspective view of an HVAC system, including the blower assembly of FIG. 1 and an evaporator assembly.

Referring now to FIG. 5, an HVAC system 10 is shown with the blower assembly 12 and an evaporator assembly 54 according to an exemplary embodiment. Evaporator assembly 54 includes a vertically elongate evaporator housing 56 (e.g., housing assembly, case, shell, body, etc.) and an evaporator 58 (shown in FIGS. 6 and 8) disposed within the evaporator housing 56. The evaporator assembly 54 is disposed in the HVAC system 10 downstream from the blower assembly 12 and is configured to receive air from the blower assembly 12. The evaporator housing 56 defines an evaporator inlet 60 configured to be coupled to the blower outlet 34 either directly or indirectly to receive air therethrough from the blower assembly 12. For example, the evaporator inlet 60 may define substantially the same profile as the blower outlet 34, such that the evaporator housing 56 may be coupled directly to the blower housing 14. The evaporator housing 56 further defines an evaporator outlet 61 (shown in FIGS. 6 and 7) configured to output cooled air from the HVAC system 10 to a passenger compartment of a vehicle. A plurality of clips 62 extend between the evaporator housing 56 and the blower housing 14, coupling the evaporator and blower housings 14 with an interference fit. It should be understood that the evaporator housing 56 and the blower housing 14 may be coupled in other ways, according to other exemplary embodiments.

Referring still to FIG. 5, the evaporator housing 56 is formed from at least two components, including a first (i.e., lower, rear, etc.) body 64 and an opposing second (i.e., upper, forward, etc.) body 66 disposed on and engaging the first body 64. According to an exemplary embodiment, corresponding edges of the first body 64 and the second body 66 may define substantially the same outer profile, such that the edges are configured to align and/or mate with each other. Further, the edges of the first and second bodies 64, 66 of the evaporator housing 56 may be substantially co-planar with the corresponding edges of the first and second bodies 22, 24 of the blower housing 14 or may be in different orientations according to other exemplary embodiments.

Similarly to the blower housing 14, as shown in FIG. 5, the first and second bodies 64, 66 of the evaporator housing 56 each define a skeleton (e.g., mesh, lattice, grid, etc.) structure configuration, which forms an outer profile of the evaporator assembly 54. The skeleton structures include plastic or other material forming solid portions or features (e.g., walls) at each of the edges (e.g., at the evaporator inlet 60), and transition regions, such as those forming corners between lateral and vertical surfaces of the first and second bodies 64, 66. Voids (i.e., windows) are formed between various edges and transition regions, reducing the overall plastic material in the evaporator housing 56 and therefore reducing the weight.

Figure 6:
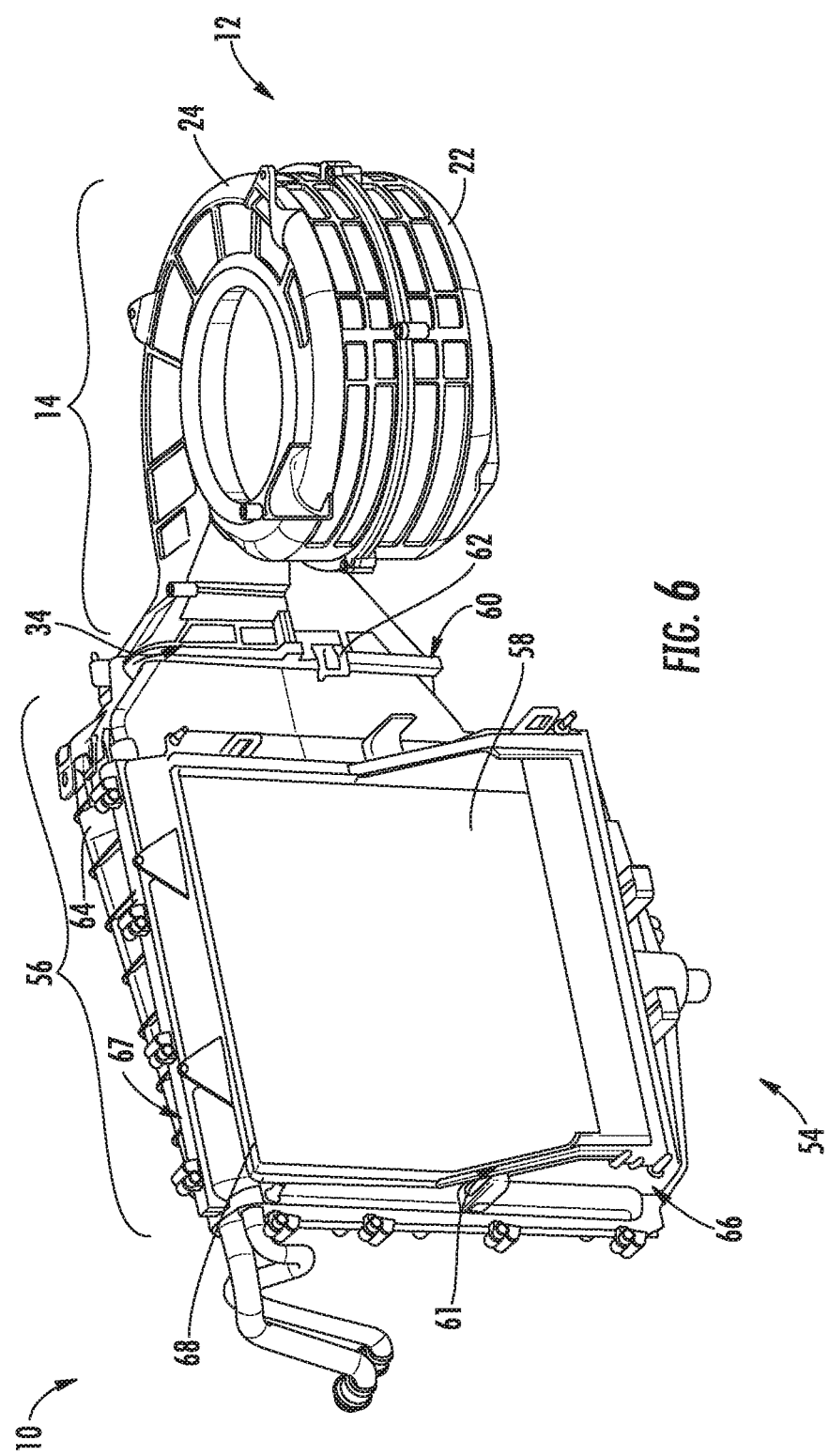
FIG. 6 is a perspective view of another embodiment of an HVAC system.

Referring now to FIG. 6, the HVAC system 10 is shown according to another exemplary embodiment. Specifically, the evaporator assembly 54 may be assembled differently than shown in FIG. 5. For example, the second body 66 of the evaporator housing 56 may be disposed on a rear end of the first body 64, such that the first and second bodies 64, 66 are assembled front to rear. In this configuration, a seam 67 is formed between the first and second bodies 64, 66 in a vertical orientation and is substantially parallel to or co-planar with the evaporator 58.

Figure 7:
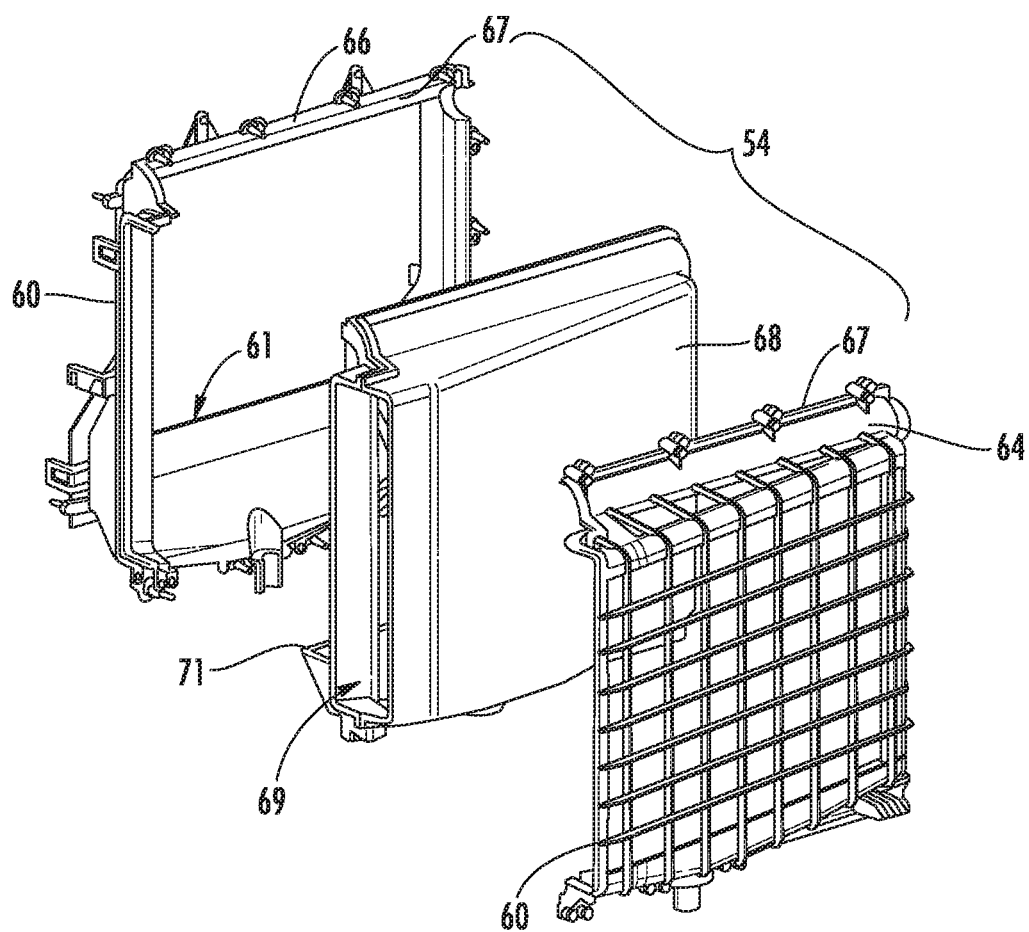
FIG. 7 is an exploded view of an evaporator assembly in the HVAC system of FIG. 6.

Referring now to FIG. 7, an exploded view of the evaporator assembly 54 is shown according to an exemplary embodiment. As shown in FIG. 7, the first body 64 has the skeleton mesh structure described above and the second body 66 is solid. It should be understood that according to other exemplary embodiments, the second body 66 or both the first and second bodies 64, 66 may have the skeleton mesh structures described above and shown in FIG. 5. Referring still to FIG. 7, the evaporator assembly 54 further includes a foam evaporator liner 68 (i.e., a liner) disposed within and defining a complementary shape to the evaporator housing 56. The evaporator liner 68 defines an evaporator liner inlet 69 complementary to and substantially the same shape as and aligned with the evaporator inlet 60. Similarly, the evaporator liner 68 defines an evaporator liner outlet 71 complementary to and substantially the same shape as and aligned with the evaporator outlet 61 formed in the evaporator housing 56 (e.g., in the second body 66).

Figure 8:
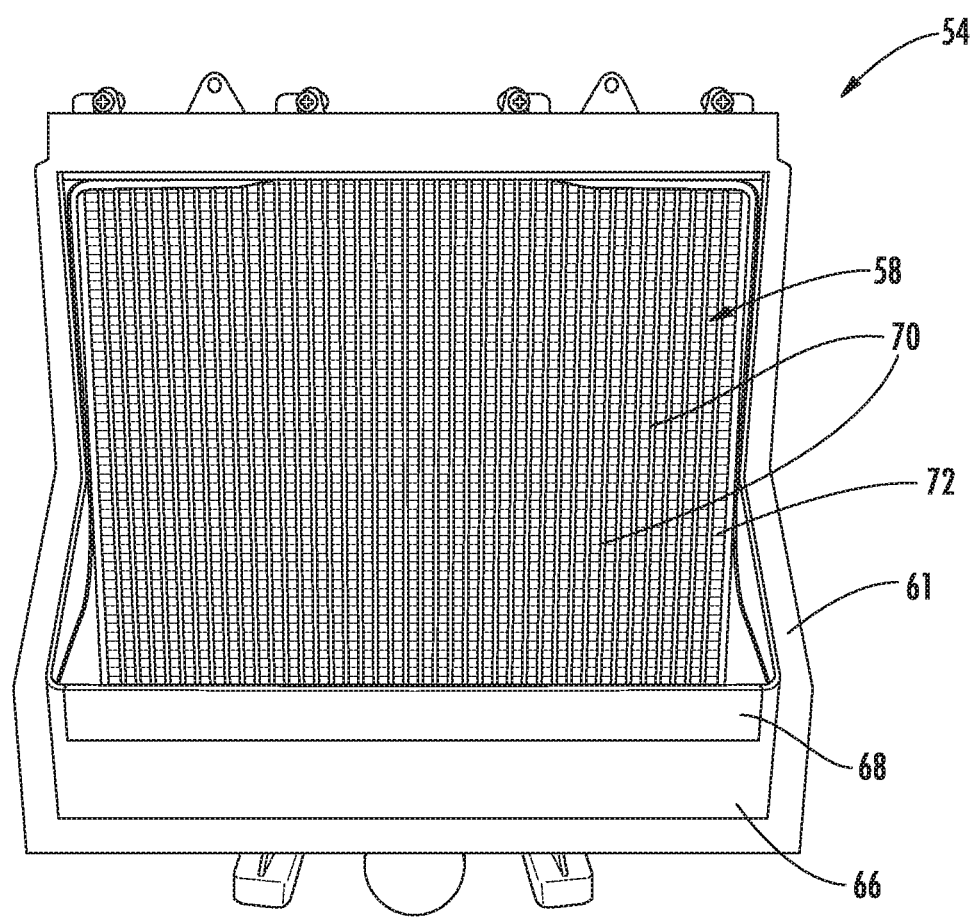
FIG. 8 is a cross-sectional view of a portion of the evaporator assembly of FIG. 7.

Referring now to FIG. 8, the evaporator assembly 54 of FIGS. 6 and 7 is shown with a portion of the evaporator housing 56 broken away. FIG. 6 further shows a foam evaporator liner 68 (i.e., a liner) disposed within and defining a complementary shape to the evaporator housing 56. The evaporator liner 68 cover substantially all of the interior surfaces of the evaporator housing 56. As shown in FIG. 8, the evaporator liner 68 is also broken away, showing the evaporator 58 disposed within the evaporator liner 68.

With respect to the evaporator 58, a plurality of cooling lines 70 (i.e., fins, vanes, etc.) extend vertically or in other directions within the evaporator 58 and are configured to pass a refrigerant therethrough. During operation of the HVAC system 10, air is pushed from the blower assembly 12, blower outlet 34, and fed to the evaporator inlet 60 to the evaporator 58. The air then passes through the evaporator 58 along or through the cooling lines 70, as heat is transferred from the air, through the cooling lines 70 and to the refrigerant, which evaporates from a liquid state to a gaseous state. As heat is transferred from the air, the temperature of the air decreases and cooled air is output from the evaporator 58. During the cooling process in the evaporator assembly 54, condensation from the cooled air forms within the evaporator housing 56 and collects within the evaporator housing 56.

Referring still to FIG. 8, the evaporator 58 is disposed within the evaporator liner 68. Specifically, the evaporator 58 defines an outer periphery 72 (e.g., proximate the seam 67) configured to engage the inner surface of the evaporator housing 56 through the evaporator liner 68. In this configuration, the evaporator liner 68 engages substantially the entire outer periphery 72 of the evaporator 58, and the evaporator liner 68 is compressed between substantially the entire outer periphery 72 and the evaporator housing 56. In a conventional evaporator assembly, the evaporator is disposed within an evaporator housing with a gasket surrounding just an outer periphery of the evaporator and compressed between the evaporator and the evaporator housing. The installation of the gasket requires additional tooling and steps, which adds to the cost and complexity of assembling the evaporator assembly. Without an evaporator liner, additional gaskets would also be required between the first and second bodies 64, 66, to prevent condensation from leaking out of the evaporator housing 56. Further, a vertical seam 67 as provided in FIGS. 6 and 7 still may not be possible in a conventional HVAC system without an evaporator liner without water from leaking through the seam 67 out the bottom of the evaporator housing 56.

In the evaporator assembly 54 in FIG. 8, the evaporator liner 68 is disposed between the evaporator 58 and the evaporator housing 56 as well as fully surrounding the evaporator 58, apart from the evaporator liner inlet 69 and evaporator liner outlet 71 allowing air to pass through the evaporator assembly 54. In this configuration, the evaporator liner 68 engages substantially an entire interior surface of the evaporator housing 56. By positioning and compressing the evaporator liner 68 between the evaporator 58 and the evaporator housing 56, the evaporator 58 is held securely in place within the evaporator housing 56 and prevents noise due to contact between the metal cooling lines 70 and the plastic evaporator housing 56. Further, because the evaporator 58 is fully surrounded by the evaporator liner 68, the first and second bodies 64, 66 of the evaporator housing 56 do not need to be sealed to each other. Instead, the evaporator 58 is sealed within the evaporator liner 68, such that the air in the evaporator assembly 54 directly engages the evaporator liner 68, rather than the evaporator housing 56. In this configuration, the evaporator assembly 54 collects substantially all of the condensation formed by the evaporator 58 within the evaporator liner 68. The closed-cell foam forming the evaporator liner 68 (e.g., crosslinked polyethylene, polypropylene, etc. substantially the same as the foam forming the blower liner 42) also thermally insulates the evaporator liner 68, preventing the evaporator 58 from substantially lowering the temperature of the evaporator housing 56. This thermal insulation prevents condensation from forming on an exterior surface of the evaporator assembly 54 and/or other portions of the HVAC system 10, preventing condensation from dripping from the HVAC system 10 onto the ground. The thermal insulation further improves the operational efficiency of the evaporator assembly 54 by preventing or limiting heat from passing from outside the evaporator housing 56, through the evaporator liner 68, and to the air proximate the evaporator 58.

It should be recognized that while the FIGURES show the HVAC system 10 with an evaporator 58 disposed downstream from the blower 16, according to other exemplary embodiments, the evaporator 58 may be disposed upstream from the blower 16. According to yet another exemplary embodiment, the evaporator 58 may be a heater for heating the air from or to the blower 16. In this configuration, the cooling lines 70 are heating coils configured to transfer heat from the heater to the air passing along the heating coils, thereby increasing the temperature of the air output from the heater. According to yet another exemplary embodiment, the HVAC system 10 may include a heater in addition to the evaporator 58.

Referring again to FIG. 6, the HVAC system 10 includes an adapter 74 (i.e., scroll adapter, evaporator adapter, adapter, coupling, connector, manifold, etc.). While FIG. 5 shows the evaporator inlet 60 coupled directly to the blower outlet 34, as shown in FIG. 6, an adapter 74 is disposed between the blower assembly 12 and the evaporator assembly 54 and may be configured to couple any blower assembly 12 with any evaporator assembly 54. For example, the adapter 74 defines a conduit having various shapes, allowing the evaporator assembly 54 to be positioned at various angles or translated relative to the blower assembly 12 to fit within a manufacturer's provided package space. In this configuration, the same blower assembly 12 and evaporator assembly 54 may be used in different vehicles, with only the adapter 74 being modified to accommodate the package space. As a result, the time and cost associated with designing the HVAC system 10 for a specific application is greatly reduced by using a standardized blower assembly 12 and evaporator assembly 54.

Figure 9:
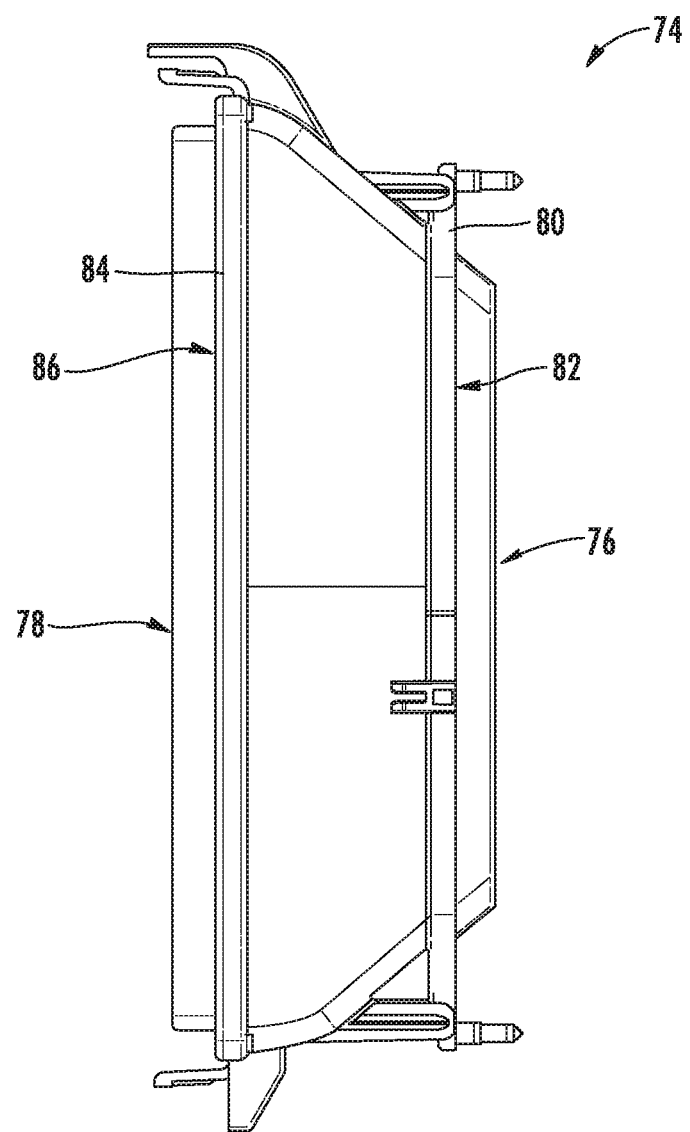
FIG. 9 shows an isolated view of an adapter from the HVAC system of FIG. 6.

Referring now to FIG. 9, the adapter 74 is shown isolated in more detail. The adapter 74 includes an adapter inlet 76 at an upstream end configured to be coupled to the blower outlet 34 and an adapter outlet 78 and a downstream end configured to be coupled to the evaporator inlet 60. The adapter 74 may be coupled (e.g., with adhesive, fasteners, form fitting, interference fit, etc.) to the blower outlet 34 and the evaporator inlet 60. In the configuration shown in FIGS. 6 and 9, the adapter 74 increases in cross-sectional area in the downstream direction, such that the cross-sectional area at the adapter outlet 78 is greater than the cross-sectional area at the adapter inlet 76. In this configuration, the adapter 74 may operate as a manifold.

Referring still to FIG. 9, the adapter 74 includes an inlet (i.e., first, upstream, etc.) lip 80 extending laterally outward from the adapter 74 proximate and parallel to (i.e., offset from) the adapter inlet 76. The inlet lip 80 curls toward the adapter inlet 76, forming an inlet recess 82 between the inlet lip 80 and an outer surface of the adapter 74. As discussed below, the inlet recess 82 is configured to receive a corresponding portion of the blower outlet 34.

The adapter 74 further includes an outlet (i.e., second, downstream, etc.) lip 84 extending laterally outward from the adapter 74 proximate and parallel to (i.e., offset from) the adapter outlet 78. The outlet lip 84 curls toward the adapter outlet 78, forming an outlet recess 86 between the outlet lip 84 and the outer surface of the adapter 74. As discussed below, the outlet recess 86 is configured to receive a corresponding portion of the evaporator inlet 60.

It should be understood that while FIG. 9 shows the adapter 74 having solid surfaces, according to other exemplary embodiments, the adapter 74 further defines a skeleton structure, substantially similarly to the skeleton structures for each of the blower housing 14 and the evaporator housing 56. The adapter 74 may also include a foam adapter liner (not shown) disposed therein and configured to engage an inner surface of the adapter 74. For example, the adapter liner may be substantially similar to the blower liner 42 and/or the evaporator liner 68.

Figure 10:
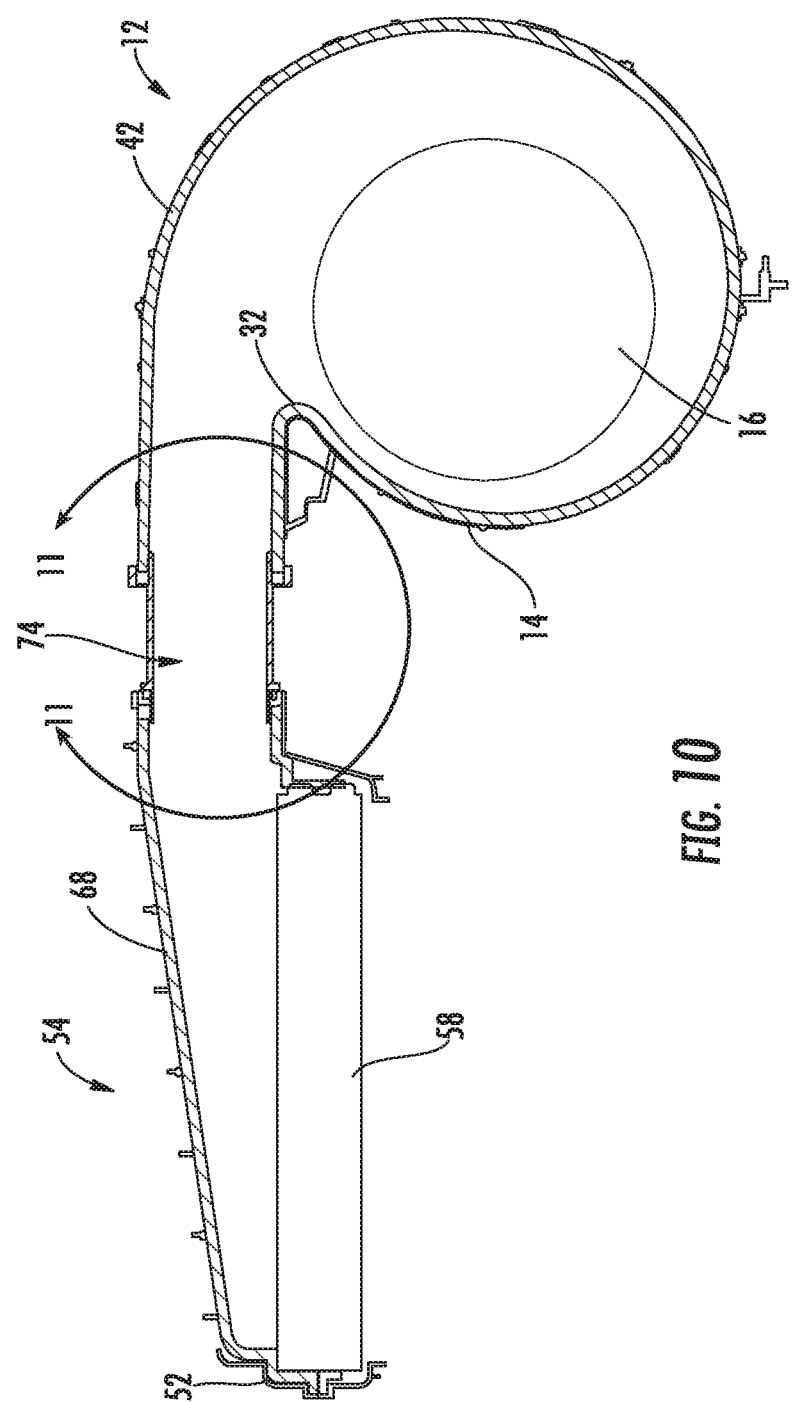
FIG. 10 is a cross-sectional view of the HVAC system of FIG. 6.

Referring now to FIG. 10, a cross-sectional view of the HVAC system 10 of FIG. 6 is shown according to an exemplary embodiment. The adapter 74 is shown disposed between and coupling the blower assembly 12 and the evaporator assembly 54.

Figure 11:
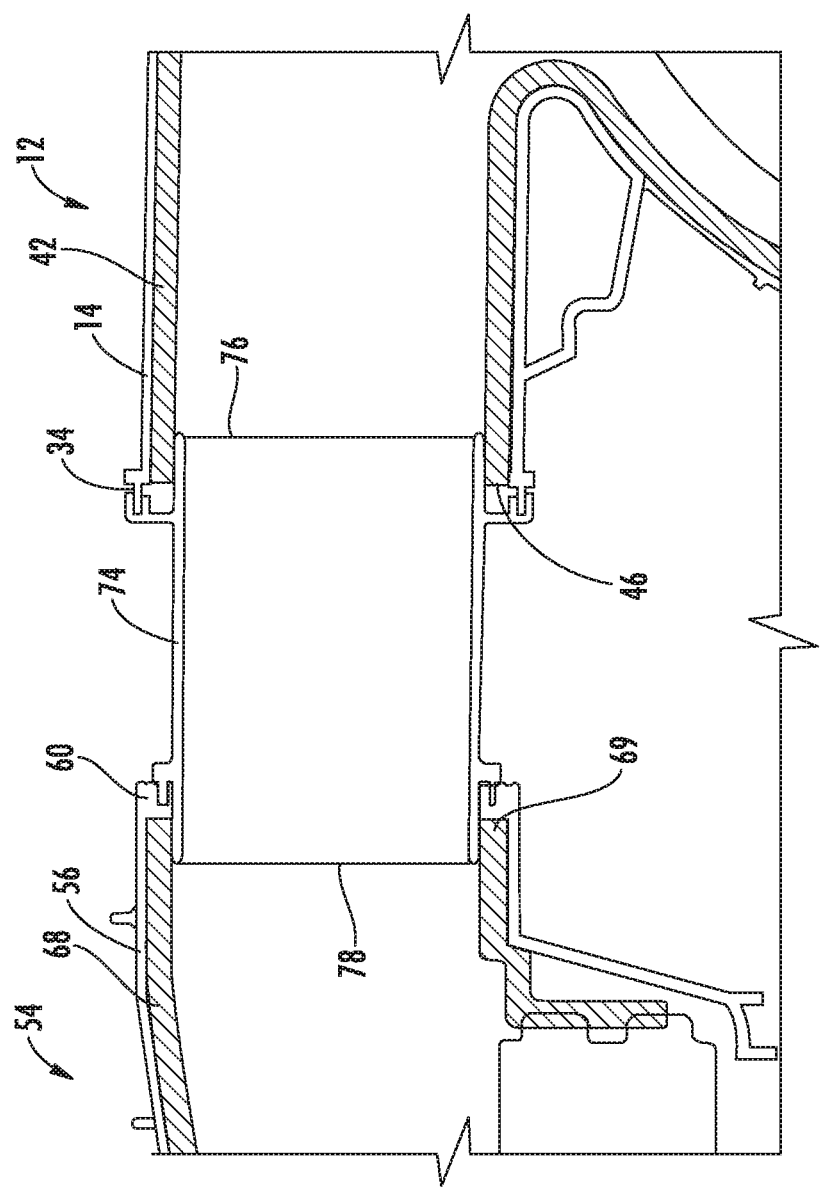
FIG. 11 is a close-up view of a portion of the HVAC system shown in FIG. 10, showing the adapter connecting the blower assembly and the evaporator assembly.

Referring now to FIG. 11, the connection between the adapter 74 and each of the blower assembly 12 and the evaporator assembly 54 is shown in more detail. As shown in FIG. 11, the adapter inlet 76 is disposed in the blower housing 14 and extends into the blower housing 14 upstream from the blower outlet 34. The blower liner 42, and in particular the portion of the blower liner 42 proximate the blower liner outlet 46 is disposed annularly about the adapter inlet 76, between the adapter 74 and the blower housing 14. In this configuration, the adapter inlet 76 interferes with the blower liner 42 and prevents the blower liner 42 from collapsing inward and blocking airflow at the blower liner outlet 46. According to an exemplary embodiment, the blower liner 42 may be compressed between the adapter inlet 76 and the blower housing 14, such that the adapter inlet 76 is press-fit in the blower housing 14 at the blower outlet 34. This press-fit arrangement based on the compression of the blower liner 42 between the adapter inlet 76 and the blower housing 14 seals the connection between the adapter 74 and the blower housing 14. The sealed arrangement ensures that the HVAC system 10 is airtight and therefore improves the overall efficiency of the HVAC system 10 by preventing air from leaking at these connection points, while preventing whistling or other noises typically generated when air passes through a narrow seam between two surface.

The adapter outlet 78 is disposed in the evaporator housing 56 and extends into the evaporator housing 56 downstream from the evaporator inlet 60. The evaporator liner 68, and in particular the portion of the evaporator liner 68 proximate the evaporator liner inlet 69 is disposed annularly about the adapter outlet 78, between the adapter 74 and the evaporator housing 56. In this configuration, the adapter outlet 78 interferes with the evaporator liner 68 and prevents the evaporator liner 68 from collapsing inward and blocking airflow at the evaporator liner inlet 69. According to an exemplary embodiment, the evaporator liner 68 may be compressed between the adapter outlet 78 and the evaporator housing 56, such that the adapter outlet 78 is press-fit in the evaporator housing 56 at the evaporator inlet 60. As discussed above with respect to blower outlet 34, the press-fit arrangement based on the compression of the evaporator liner 58 between the adapter outlet 78 and the evaporator housing 56 seals the connection between the adapter 74 and the evaporator housing 56.

Figure 12:
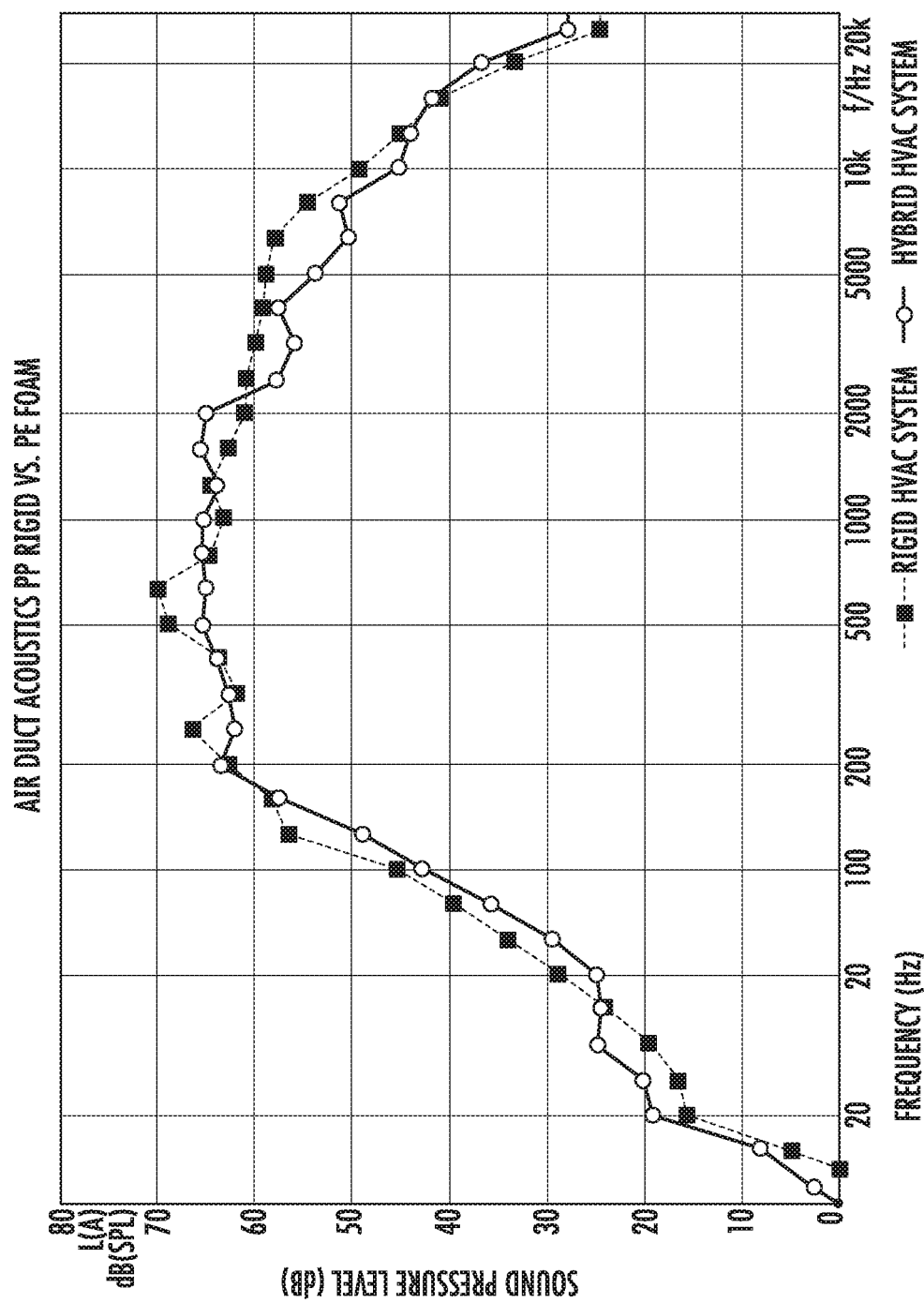
FIG. 12 is a graph comparing the acoustic performance of an all-plastic polypropylene HVAC system to a hybrid system with a plastic skeleton and a foam liner.

FIG. 12 is a graph comparing the acoustic performance of a conventional all-plastic polypropylene HVAC system ("Rigid PP HVAC System") to an example of a hybrid HVAC system, similar to the hybrid HVAC system 10 discussed above. As shown in FIG. 12, the use of foam for the blower and evaporator liners in the hybrid HVAC system results in noise reduction in a range of approximately 2 dB to 4 dB at most frequencies between approximately 50 Hz and 15,000 Hz. Specifically, the sound deadening properties of the foam absorbs noise generated by the fan cage and/or provides smoother surfaces, thereby reducing turbulence generated in the hybrid HVAC system and therefore reducing noise generated due to air turbulence.

Figure 13:
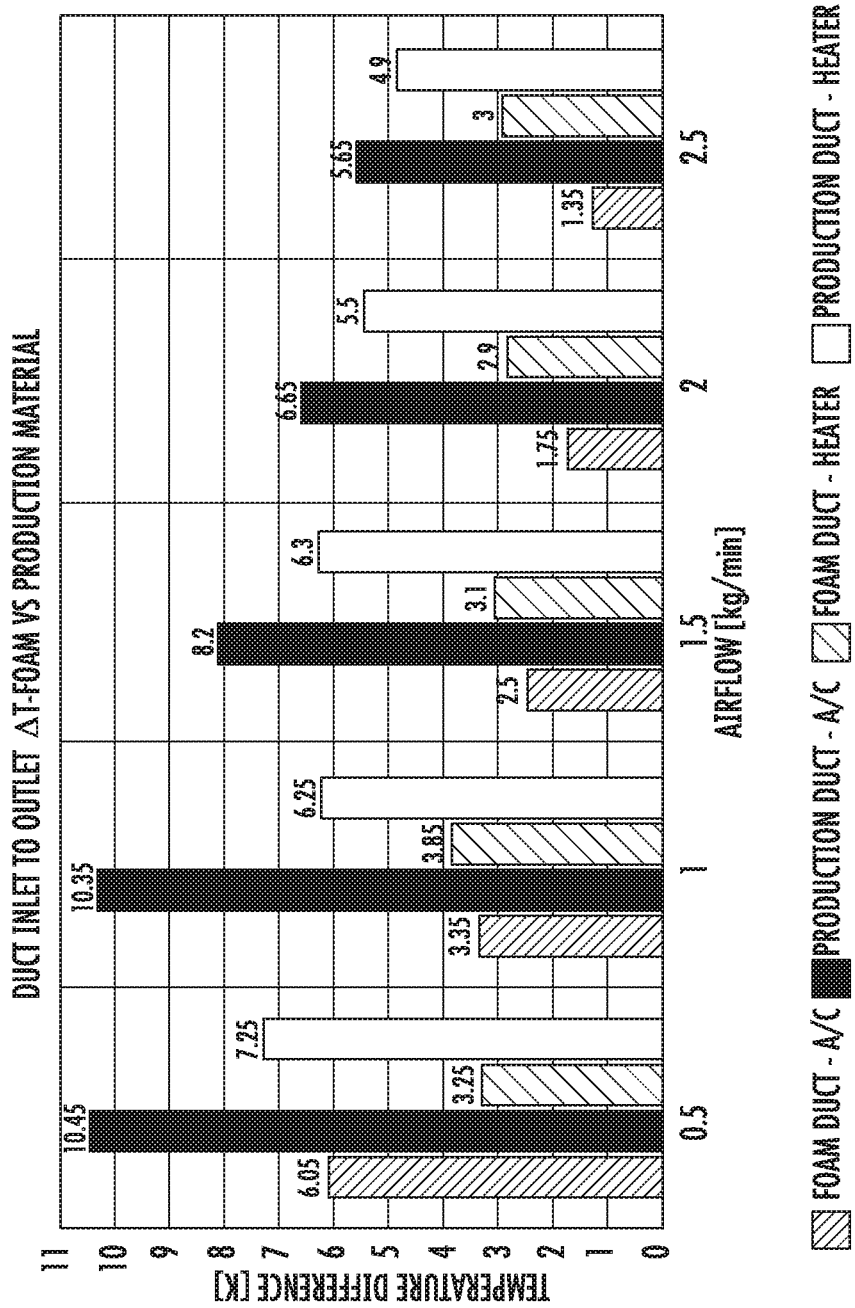
FIG. 13 is a graph comparing the thermal performance of an all-plastic polypropylene HVAC system to a hybrid system with a plastic skeleton and a foam liner.

FIG. 13 is a graph comparing thermal performance of a conventional ("Production Duct") HVAC system in both heating and cooling configurations with an example of a hybrid HVAC system, similar to the hybrid HVAC system 10 ("Foam Duct") discussed above. The measurements for FIG. 13 are taken in sample ducts, with the Production Duct formed from rigid plastic only and the Foam Duct formed from the above-referenced foam. As shown in FIG. 13, in each configuration, the change in temperature in the duct is substantially less for the Foam Duct than for the Production Duct, demonstrating that heat loss is reduced with the hybrid structure in the hybrid HVAC system.

Referring now to FIG. 14, a table is provided showing the mass reduction in the HVAC system 10 according to an exemplary embodiment, compared to an all-plastic HVAC system having the same shape and layout. As shown in FIG. 14, the introduction of foam blower and evaporator liners 42, 68 allow voids to be formed in the blower and evaporator housings 14, 56, reducing the overall mass. Specifically, more plastic mass is removed due to the voids than is added due to the introduction of foam. For example, the blower housing 14, the evaporator housing 56, and/or other components of the HVAC system 10 experience a mass reduction of up to approximately 40% plastic material. According to an exemplary embodiment, mass is reduced between approximately 20% and 25%. In the HVAC system 10 described in FIG. 14 each of the first and second bodies 22, 24 of the blower housing 14 and first and second bodies 64, 66 of the evaporator housing 56 experience a mass reduction, such that the total plastic mass reduction for the four-piece assembly is between approximately 250 g and 450 g. According to an exemplary embodiment, the total plastic weight reduction for the four-piece assembly is approximately 300 g. Of course, the specific mass reductions attainable will depend on a variety of factors including the specific configuration of the particular HVAC system involved.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A heating, ventilating, and air conditioning system comprising:
   a blower housing comprising a blower inlet and a blower outlet, the blower housing having a plastic skeleton structure that includes a plurality of voids extending therethrough; and
   a foam blower liner disposed within and coupled to the blower housing, wherein the foam blower liner extends along and covers the plurality of voids.

2. The heating, ventilating, and air conditioning system of claim 1, wherein:
   the blower housing further comprises a first body and an opposing second body disposed on the first body; and
   the blower housing defines a mesh structure.

3. The heating, ventilating, and air conditioning system of claim 2, wherein the first body has a material thickness that is greater than a material thickness of the second body.

4. The heating, ventilating, and air conditioning system of claim 2, wherein:
   the blower liner is a three-dimensional foam and defines a flange; and
   the flange is sandwiched between the first body and the second body.

5. The heating, ventilating, and air conditioning system of claim 4, the blower liner is configured to be ultrasonically welded to the blower housing proximate the blower inlet.

6. The heating, ventilating, and air conditioning system of claim 1, wherein the blower housing defines a mesh structure comprising a solid wall proximate a scroll cut-off defined between a scroll portion and a manifold portion of the blower housing.

7. The heating, ventilating, and air conditioning system of claim 6, wherein the foam liner is configured to be ultrasonically welded to the blower housing proximate the scroll cut-off.

8. The heating, ventilating, and air conditioning system of claim 1 further comprising a blower having a motor and a fan cage, the blower provided in the blower housing.

9. The heating, ventilating, and air conditioning system of claim 8, wherein:
   the first body defines a fan opening configured to receive at least a portion of the blower therethrough; and
   the blower inlet is configured to receive an ultrasonic welding tool therethrough that is configured to ultrasonically weld the blower liner to the blower housing.

10. The heating, ventilating, and air conditioning system of claim 9, wherein the blower liner defines:
    a blower liner inlet complementary to the blower inlet; and
    a liner fan opening complementary to the fan opening.

11. The heating, ventilating, and air conditioning system of claim 1, further comprising an evaporator disposed downstream from the blower housing.

12. The heating, ventilating, and air conditioning system of claim 11, further comprising:
    an evaporator housing comprising an evaporator inlet and an evaporator outlet, the evaporator housing having a plastic skeleton structure; and
    a foam evaporator liner disposed within and engaging the evaporator housing;
    wherein the evaporator is disposed in the evaporator liner.

13. The heating, ventilating, and air conditioning system of claim 12, wherein at least a portion of the evaporator liner is compressed between the evaporator and the evaporator housing.

14. The heating, ventilating, and air conditioning system of claim 12, further comprising an adapter comprising an adapter inlet extending into the blower outlet and an adapter outlet extending into the evaporator inlet.

15. The heating, ventilating, and air conditioning system of claim 12, wherein:
- the evaporator housing comprises a first body and an opposing second body disposed on the first body; and
- at least one of the first or second bodies defines a mesh structure.

16. The HVAC A heating, ventilating, and air conditioning system comprising:
- a blower housing comprising a blower inlet and a blower outlet, the blower housing having a plastic skeleton structure;
- a foam blower liner disposed within and coupled to the blower housing;
- an evaporator disposed downstream from the blower housing;
- an evaporator housing comprising an evaporator inlet and an evaporator outlet, the evaporator housing having a plastic skeleton structure;
- a foam evaporator liner disposed within and engaging the evaporator housing;
- wherein the evaporator is disposed in the evaporator liner; and
- an adapter comprising an adapter inlet extending into the blower outlet and an adapter outlet extending into the evaporator inlet,
- wherein a portion of the blower liner proximate the blower outlet is disposed between the adapter and the blower housing.

17. A heating, ventilating, and air conditioning system comprising:
- a blower housing comprising a blower inlet and a blower outlet, the blower housing having a plastic skeleton structure;
- a foam blower liner disposed within and coupled to the blower housing;
- an evaporator disposed downstream from the blower housing;
- an evaporator housing comprising an evaporator inlet and an evaporator outlet, the evaporator housing having a plastic skeleton structure;
- a foam evaporator liner disposed within and engaging the evaporator housing;
- wherein the evaporator is disposed in the evaporator liner; and
- an adapter comprising an adapter inlet extending into the blower outlet and an adapter outlet extending into the evaporator inlet,
- wherein a portion of the evaporator liner proximate the evaporator inlet is disposed between the adapter and the evaporator housing.

* * * * *

UNITED STATES PATENT AND TRADEMARK OFFICE
CERTIFICATE OF CORRECTION

PATENT NO. : 11,021,038 B2
APPLICATION NO. : 16/214391
DATED : June 1, 2021
INVENTOR(S) : Aaron Kirk Hensler and Scott Torok It is certified that error appears in the above-identified patent and that said Letters Patent is hereby corrected as shown below:

In the Claims

Column 13, Line 11, delete "The HVAC" before "A heating, ventilating, and air conditioning system comprising:"

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*